No. 684,684. Patented Oct. 15, 1901.
D. H. GARRISON.
COMBINED PLOW, CULTIVATOR, AND PLANTER.
(Application filed Jan. 21, 1901.)
(No Model.) 2 Sheets—Sheet 1.
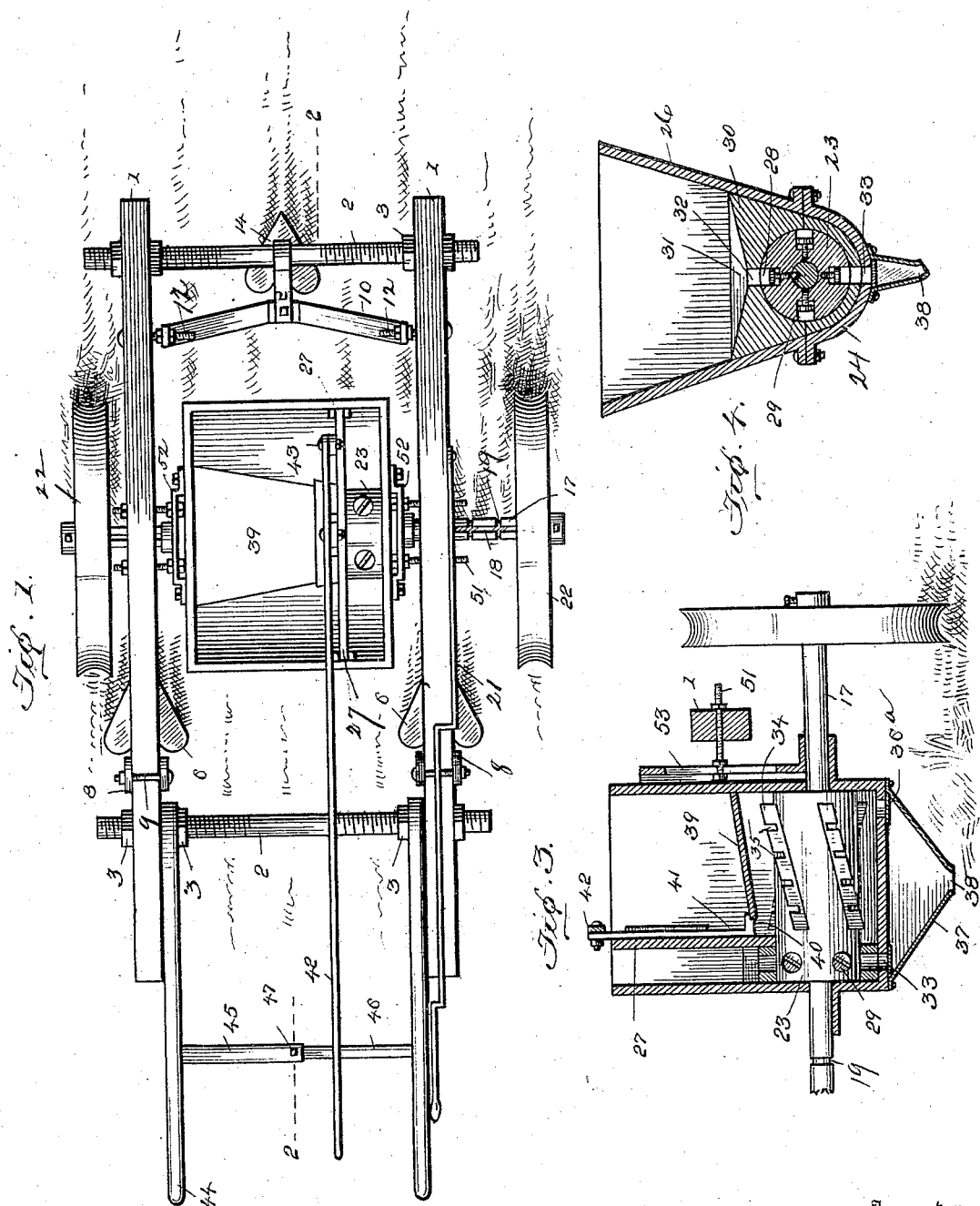
Witnesses
Inventor
D. H. Garrison,
By Victor J. Evans Attorney No. 684,684. Patented Oct. 15, 1901.
D. H. GARRISON.
COMBINED PLOW, CULTIVATOR, AND PLANTER.
(Application filed Jan. 21, 1901.)
(No Model.) 2 Sheets—Sheet 2.
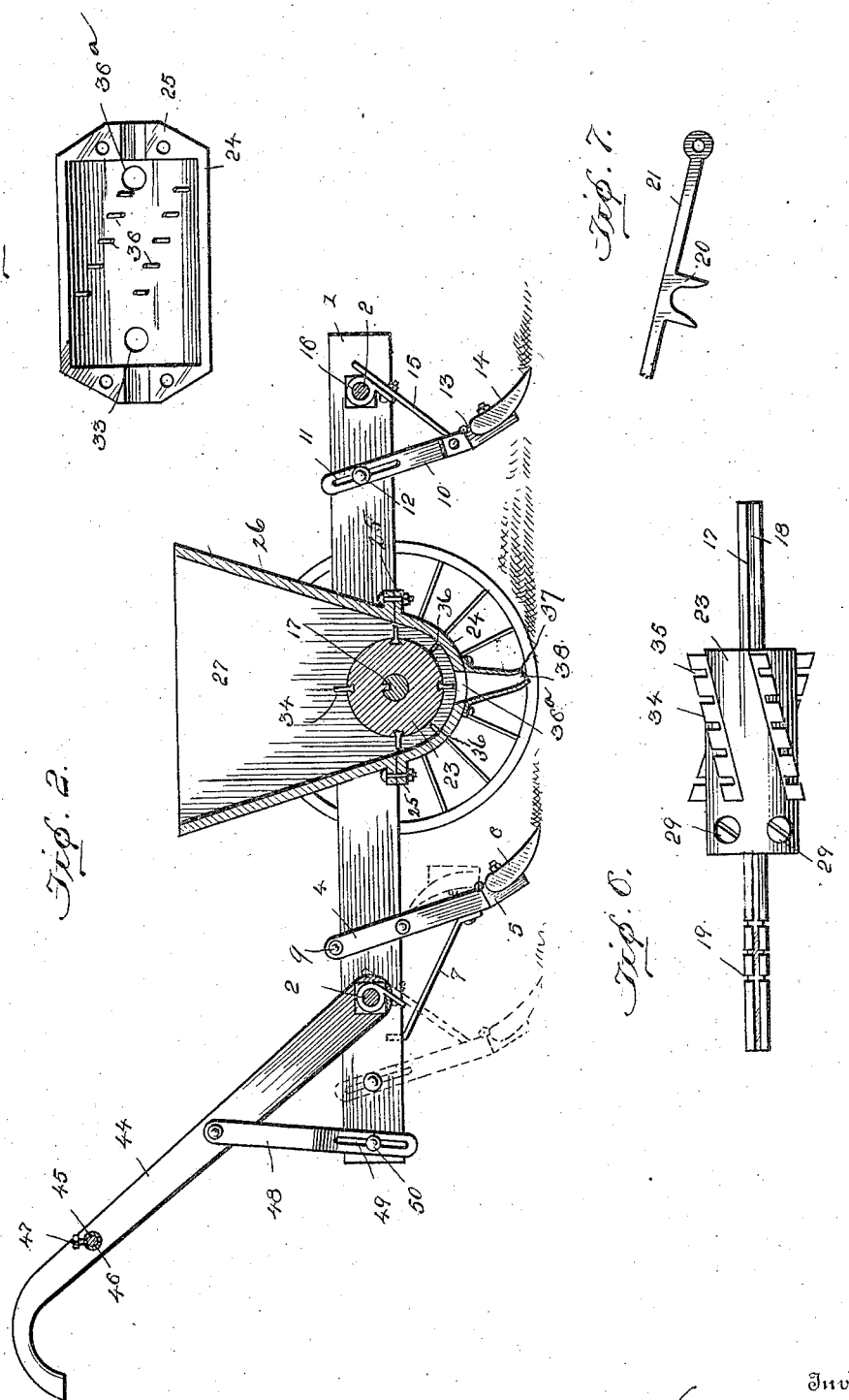
Witnesses
Inventor
D. H. Garrison,
By Victor J. Evans, Attorney

UNITED STATES PATENT OFFICE.

DOCTOR H. GARRISON, OF COST, GEORGIA.

COMBINED PLOW, CULTIVATOR, AND PLANTER.

SPECIFICATION forming part of Letters Patent No. 684,684, dated October 15, 1901.

Application filed January 21, 1901. Serial No. 44,151. (No model.)

*To all whom it may concern:*

Be it known that I, DOCTOR H. GARRISON, a citizen of the United States, residing at Cost, in the county of Banks and State of Georgia, have invented new and useful Improvements in a Combined Plow, Cultivator, and Planter, of which the following is a specification.

This invention relates to new and useful improvements in combined plows, cultivators, and planters; and its primary object is to provide a device which is extremely simple in construction and which is adapted to plow the ground, plant seed and fertilizer at regular intervals, and cover the seed all during one trip across the field.

A further object is to provide means of peculiar construction whereby the plows may be readily adjusted from or toward each other.

Another object is to provide a novel device for distributing seed and fertilizer at the same time, said fertilizer being ground before the same is discharged from the hopper.

The invention consists in the novel construction and combination of parts hereinafter more fully described and claimed, and illustrated in the accompanying drawings, showing the preferred form of my invention, and in which—

Figure 1 is a plan view of the device. Fig. 2 is a longitudinal section therethrough. Fig. 3 is a transverse section through the hopper. Fig. 4 is a longitudinal section through the seed-distributing portion of the hopper. Fig. 5 is a top plan view of the bottom of the hopper. Fig. 6 is a similar view of the cylinder and its axle, and Fig. 7 is a detail view of the catch for locking the frame to the axle.

Referring to said figures by numerals of reference, 1 1 are the parallel side beams of the frame of the device, and these are connected by threaded rods 2, upon which are mounted nuts 3, which are arranged at opposite sides of each side beam and are adapted to lock said beams in adjusted position upon the rods 2. Plows are secured to each of the beams in any suitable manner.

Referring to Fig. 2, 4 is a shank, to the lower end of which is hinged a block 5, having a plow-blade 6 secured thereto. A brace 7 is secured to the rear edge of the shank 4 and to the bottom of the side beam and serves to prevent backward movement of the plow. A standard 8 is arranged upon the opposite side of the beam 1 and is secured to the shank 4 in any suitable manner, as by means of bolts 9.

A V-shaped hanger 10 is arranged between the beams 1 at the front end and is provided at points adjacent to its ends with longitudinally-extending slots 11. These slots are adapted to receive bolts 12, which engage the side beams 1, and nuts are arranged upon these bolts, whereby the hanger 10 may be securely held in position between the beams.

Hinged to the lower portion of the hanger 10 is a block 13, to which is secured a plow-blade 14. A brace 15 extends upward from the hanger 10 adjacent to the hinged block 13 and is adjustably secured to a sleeve 16, which is mounted upon the threaded rod 2, before referred to.

An axle 17 extends transversely beneath the frame and is provided with a longitudinally-extending groove 18 and annular grooves 19. These annular grooves are adapted to be engaged by a catch 20, which extends from a lever 21, pivoted at one end to one of the beams and the opposite end of which lies at a point where it may be readily grasped. The catch 20 extends on opposite sides of the axle, and when the same fits within one of the grooves 19 prevents lateral movement of the axle.

Traction-wheels 22 are secured to the axle 17 at the ends thereof. A cylinder 23 is secured upon the axle 17 and is movable longitudinally thereon, the same being provided with a feather which engages the longitudinally-extending groove 18. This cylinder lies within a hopper, which is formed, preferably, of two sections, the lower section 24 of which is preferably substantially semicylindrical and is provided with flanges 25, upon which rest similar flanges formed at the lower edges of the upper portion 26 of the hopper. This upper portion is provided with a vertical partition 27, which incloses the cylinder and divides the hopper into two compartments.

Recesses 28 are formed within the periphery of the cylinder at one end thereof, and mounted within these recesses are screws 29, and it is obvious that when these screws are turned they may be adjusted from or toward the center of the cylinder, thereby diminishing or increasing the size of the pocket formed by the recess.

A block 30 is fitted within the compartment of the hopper, which contains the recessed end of the cylinder, and this block fits snugly about the cylinder, the top thereof being concaved, as at 31, and provided with an aperture 32, which is substantially in vertical alinement with a second aperture 33, formed within the bottom of the hopper. That portion of the cylinder 23 which lies within the remaining portion of the hopper is provided with diagonally-arranged blades 34, each of which is slotted, as at 35.

Spikes 36 extend upward from the bottom 24 of the hopper, and the slots 35, before referred to, are adapted to receive them as the cylinder revolves. A second aperture 36ª is arranged below the bladed portion of the cylinder 23, and this aperture 36ª opens into the top of a substantially funnel-shaped casing 37, which is secured to the bottom of the hopper and which is provided with an outlet 38. An inclined partition 39 is arranged within the hopper over the bladed portion of the cylinder, and a passage 40 is formed at one edge thereof and is normally closed by a slide 41, which is slidably mounted upon the vertical partition 27, before referred to.

A lever 42, which is fulcrumed upon the partition 27, as at the point 43, is pivotally secured to the slide, and it is obvious that when the lever is raised or lowered the distance of the slide 41 from the partition 39 may be readily regulated.

Handles 44 are secured upon the rear rod 2 and are connected adjacent to their outer ends by an extensible rod, which is preferably formed of a tube 45 and a rod 46, which extends thereinto. A set-screw 47 may be employed for locking these sections of the rod together.

Supporting-links 48 are pivoted to the handles 44 and are provided at their opposite ends with slots 49, adapted to receive bolts 50, which firmly clamp them to the side strips 1. The hopper 26, before referred to, is secured between the side beam 1 by means of threaded rods or bolts 51, which extend through the beams and are secured within brackets 52, arranged upon opposite sides of the hopper.

Vertical slots 53 are formed within these brackets, whereby the frame may be adjusted vertically from or toward the ground, thereby regulating the depth of the furrows cut by the plows.

In operation seed is placed within the compartment of the hopper which lies above the recessed end of the cylinder and fertilizer is placed upon the partition 39. The screws 29 are adjusted so that any desired amount of seed will be discharged from the hopper, and the slide 41 is raised so that the desired amount of fertilizer may be fed to the cylinder. When the machine is drawn forward, the middle plow 14 will cut a furrow, and the cylinder 23, which revolves with the axle 17, will carry the seed within the pockets down to the outlet 33 and discharge it into the funnel 37. At the same time the fertilizer will be carried by the blades 34 downward to the spikes 36, where the same will be thoroughly ground and then discharged through the outlet 36ª. It will be seen that the inclined blades tend to direct the fertilizer toward said outlet. The fertilizer will drop into the funnel 37 and be discharged through the outlet 38, together with the seed, into the furrow. The plows 6, which are on opposite sides of the furrow, will then fill the same.

Where it is desired to adjust the plows from or toward each other, it is merely necessary to change the positions of the nuts 3 upon the rods 2 and to place the catch 20 into engagement with the proper groove 19 within the axle 17. As I have shown in dotted lines in Fig. 2, the plow-blades may be swung upward upon their hinges when not in use and when it is desired to move the machine from place to place. Moreover, if it is desired, the hanger 10 may be placed in rear of the hopper, as shown in dotted lines in Fig. 2, and in such case it is merely necessary to secure the brace 15 to the rear cross-rod 2.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of my invention.

Having thus fully described my invention, what I claim as new, and desire to secure by Letters Patent, is—

1. The combination with side beams, of means for adjusting said beams from or toward each other; an axle supported by the beams, and having a longitudinal groove and a plurality of annular grooves; and a catch secured to one of said beams and adapted to engage the annular grooves to prevent lateral movement of the axle.

2. The combination with parallel side beams, of threaded rods extending through said beams; nuts on said rods on opposite sides of said beams; an axle supported by said beams and formed with a longitudinal groove and a plurality of annular grooves; a catch pivoted to one of the beams and adapted to engage said annular grooves; shanks secured to the beams and plow-blade secured on said shanks.

3. The combination with side beams, of a hopper arranged therebetween and secured thereto, a partition within the hopper, an axle journaled within the hopper, a cylinder thereon and within the hopper, pockets within the cylinder and opening into one of the compartments of the hopper, an outlet from said compartment, blades arranged upon the cylinder within the remaining compartment and having slots therein, spikes within said compartment adapted to pass through said slots, an outlet from said compartment, a receptacle arranged below said outlets and having an outlet therefrom, a plow arranged in front of said outlet, and plows secured to each of the side beams in rear of the hopper.

4. The combination with side beams, of a hopper arranged therebetween, slotted brackets secured to the hopper, bolts projecting from the beams and adjustably secured within the slots, an axle journaled within the hopper, a cylinder secured thereto, a partition within the hopper inclosing the cylinder and forming two compartments, recesses within the cylinder and one of the compartments, adjustable screws within the recesses for regulating the depth of the pockets, a block inclosing the recessed end of the cylinder, apertures therein forming inlets and outlets to and from the pockets respectively, inclined blades upon the cylinder and within the remaining compartment of the hopper, said blades having slots therein, spikes within said compartment adapted to pass through the slots, an outlet from said compartment, a casing secured below the hopper and adapted to receive material discharged from the two outlets, an outlet from the casing, a plow arranged in front of said outlet and plows secured to each of the side beams and in rear of the hopper.

5. A distributer for a device of the character described comprising a hopper, an axle journaled therein, a cylinder within the hopper secured to the axle, a partition within the hopper inclosing the cylinder, screws adjustably secured within recesses formed within one end of the cylinder, a block inclosing said end and having apertures serving as inlets to and from the recesses, inclined blades secured to the cylinder within the remaining compartment and having slots therein, spikes within said compartment adapted to pass through the slots, an outlet from said compartment, a partition arranged above the bladed portion of the cylinder and having a passage therethrough, a slide arranged above the passage, and means for operating the slide.

6. A distributer for a device of the character described comprising a semicylindrical base, a hopper secured thereon, an axle journaled between the base and hopper, a cylinder secured to the axle, screws adjustably secured within the recesses formed within one end of the cylinder, a partition inclosing the cylinder and forming two compartments within the hopper, a block inclosing the recessed end of the cylinder and having apertures which serve as inlets and outlets to and from the recesses, an outlet within the bottom of the hopper in alinement with the outlet of the block, inclined blades secured to the cylinder and in the remaining compartment, said blades having slots therein, spikes upon the bottom of the hopper and within said compartment and lying in the paths of the slots, an outlet from said compartment, a receptacle secured to the bottom of the hopper and adapted to receive material discharged from the outlets, an outlet from said receptacle, an inclined partition arranged above the bladed portion of the cylinder and having a passage therethrough, a slide for regulating the size of said passage, and means for operating the slide.

7. The combination with side beams, of a hopper arranged therebetween, slotted brackets to the hopper, bolts secured to the side beams and adjustably mounted within the slots, an axle journaled within the hopper, a distributer mounted upon the axle and within the hopper, an outlet from the hopper, a threaded rod connecting the side beams and permitting lateral adjustment thereof, an adjustable hanger between the side strips, a plow-blade hinged to said hanger, shanks detachably secured to the side beams, plow-blades hinged thereto, handles mounted upon one of the connecting-rods, and means for adjusting the angle of the handles to the frame.

In testimony whereof I affix my signature in presence of two witnesses.

DOCTOR H. GARRISON.

Witnesses:
I. Q. SELLERS,
A. J. BROWN.